C. Tompkins.
Take-up for Knitting Mach.
No. 948.
Reissued Apr. 24, 1860.
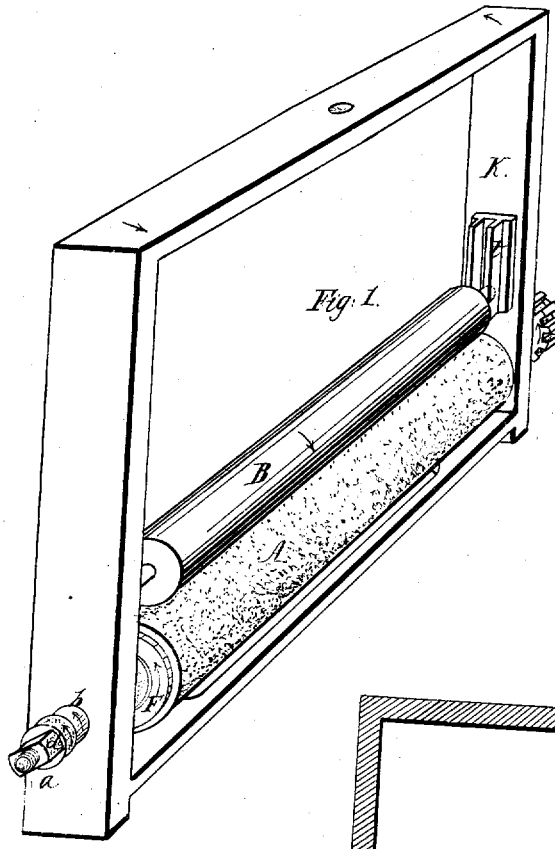
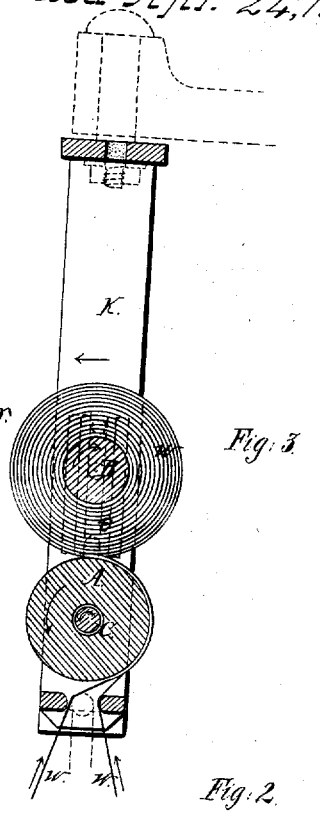
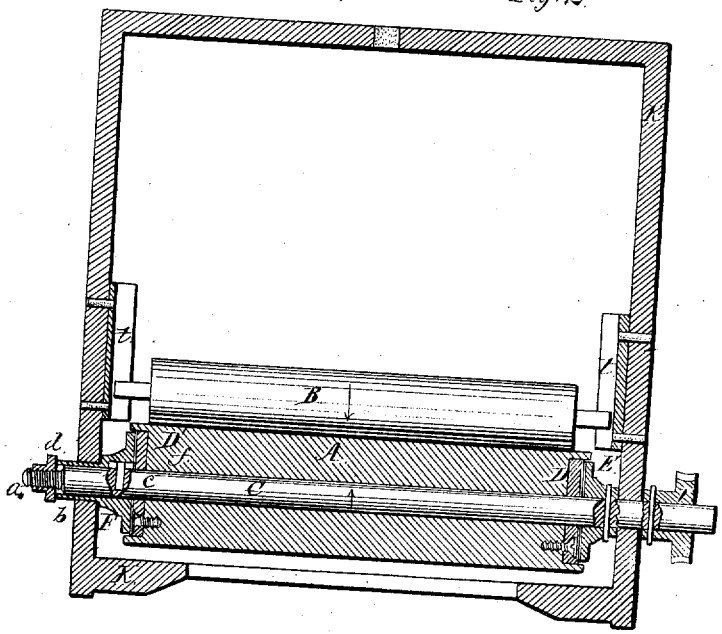
N. PETERS, PHOTO-LITHOGRAPHER, WASHINGTON, D. C.

UNITED STATES PATENT OFFICE.

CLARK TOMPKINS, OF TROY, NEW YORK.

IMPROVEMENT IN KNITTING-MACHINES.

Specification forming parts of Letters Patent No. 16,297, dated December 23, 1856; Reissue No. 948, dated April 24, 1860.

*To all whom it may concern:*

Be it known that I, CLARK TOMPKINS, of the city of Troy, in the county of Rensselaer and State of New York, have invented a new and useful Improvement on the Take-Up Mechanism for Rotary Knitting-Machines described in Letters Patent No. 13,586, issued to myself and John Johnson, September 18, 1885; and I do hereby declare that the following is a full, clear, and exact descriptien of the construction and operation of the same, reference being had to the annexed drawings, making a part of this specification, in which--

Figure 1 is a perspective view of that portion of the take-up mechanism to which my invention particularly relates; Fig. 2, a longitudinal sectional elevation, and Fig. 3 a vertical cross-section.

The same letters refer to like parts in all the figures, and the directions of motion of the parts are indicated by the arrows thereon.

In the take-up mechanism described in the Letters Patent above referred to the web is drawn from the needle-cylinder and wound up by a friction or draft roller, driving an incumbent take-up roller moving in grooves to adapt itself to the increasing size of the roll of web thereon. This draft-roller, which cannot slip on the web, is there made to positively revolve on its axis a certain uniform amount for a given number of revolutions of the needle-cylinder, whether the web is produced fast or slow. That arrangement of mechanism, when once adjusted, gives uniform tension to the web only while the web is produced at the exact speed for which the mechanism is regulated.

Yarn used for knitting varies in size, sometimes running larger and sometimes smaller than its standard size. Fine yarn "takes up" less than coarse in knitting, and since the whole body of the fabric is formed of one, or at most of three or four, threads, when the yarn is only a very little finer than its "number" the length of the web produced by a given number of revolutions of the needle cylinder is considerably less than when the yarn is of the standard size.

When the "sinkers" adjusted to feed more yarn to the needles, then also the web is produced faster than when less yarn is used; hence when the draft-roller is driven as described in said Letters Patent, if its motion is adjusted to take up the web formed of yarn of a certain size just as fast as produced, then, if the yarn happens to run a little finer, or if the sinkers are set to feed a little more yarn to the needles, the web will be produced faster than it is taken up, and soon will become too slack on the needles, or, if the yarn runs a little coarser than its gage, then the tension of the web will soon be too great, so that with every variation in the size of the yarn or adjustment of the feed-wheels the tension of the web under these circumstances often requires to be corrected by the operative, by suspending a climbing weighted roller in a bight of the web before it is wound up, as described in Letters Patent granted to myself and John Johnson, May 27, 1856, or other device by which an even tension is always given to the web, and at the same time it is taken up as fast as produced; but such addition of the weighted roller makes the mechanism too bulky and cumbersome.

My improvement is for the purpose of producing an even tension at all times and under all circumstances by the combined draft and take-up rollers alone, without appending the climbing or weighted roller and without increasing the bulk of the machinery or materially increasing the rotary take-up mechanism.

My invention consists of a roughened roller employed to take up the manufactured fabric, by turning the roller around which said fabric is wound, by its periphery or the surface of the roll as it is wound on, so as to cause the surface to move with equal velocity, as in the Patent No. 13,586, aforesaid, when said roller is combined with a friction apparatus, by which it is turned, interposed between said roller and the driving-power.

It will be noticed that taking up the fabric by means of a draft-roller applied to the surface of the roll of the fabric is not new, nor is a friction take-up new, as it has been effected by a friction-belt and other friction apparatus; but this friction apparatus, however made, was applied directly to the roller on which the fabric was rolled. In this case it is evident that as the take-up roll enlarged, the friction would be constantly changing, which renders it imperfect.

My present combination of the surface take-up with the friction-driver perfects the operation of taking up in an effectual and proper manner, with an accuracy and certainty heretofore unattained.

It is obvious that the friction can be applied at any intermediate point between the surface of the rough roller that draws off the fabric by coming in contact with it and the power which causes said roller to turn; but I prefer the following construction of parts, although any other mechanism that produces the friction between the driving-power and the roughened roller would be substantially the same—namely, a combination of the surface take-up with the friction-driver.

The construction which I prefer and its operation, are as follows:

K is the take-up frame, which is suspended above and positively turned with the needle-cylinder in the manner shown in Letters Patent No. 13,586, or in some other suitable manner. A is the rough draft or friction roller; B, the incumbent take-up roller, rising within the grooves *t t* as the quantity of the web *w* thereon increases. The roller A is so rough that it positively draws off equal lengths of web every time it makes a revolution on its axis. *r* is a worm-wheel fastened to the shaft C of the draft-roller A.

Positive rotary motion is given to the shaft C, by reason of the rotation of the take-up frame K, by means of the wheel *r* and the other means shown in the drawings of said Letters Patent No. 13,586, or by any other equivalent arrangement of means. This motion of the shaft C must be so fast that if the roller A were fastened firmly to it the surface of this roller would then always move a little faster than the web is ever produced by the knitting mechanism; but instead of the rough roller A being immovably attached to the shaft C, as heretofore, this roller is loose, so as to turn and slide a little endwise on said shaft. Disks D D′, of leather or other yielding material, are applied to its ends. E is a smooth circular disk of metal fitting the disk D and fastened to the shaft C. F is another smooth metal plate, fitting against the disk D′. The disk F is prevented from turning on the shaft by the pin *c* and groove *f*, or in some other manner which shall allow this disk to slide a little lengthwise on the shaft, so as to squeeze the roller A more or less between the disks E and F when pressure is applied to F, in order to make the adhesion of the disks of the roller A to those of the shaft C greater or less, according to the amount of tension required by the web in knitting.

The hub *b* of the plate F covers the shaft C through a side of the take-up frame, so that the tension on the web can be conveniently regulated by the screw *a* and nut *d* on the outer end of the shaft C. The disks E and F fit the disks D D′ so truly that the force required to turn the roller A on the shaft C is everywhere the same.

In using this mechanism the friction between the driving-disks and those of the roller A is first regulated by turning the nut *a* so that the driving disks shall just slip forward on the roller A, when the web has the proper tension for knitting. After this first adjustment the tension produced by the rollers A and B on the web as it is drawn by them directly from the needle-cylinder will continue the same, hour after hour, and day after day, whether the yarn from the bobbins runs fine or coarse, or whether the sinkers are set to feed more or less yarn to the needles.

What I claim as my invention, and desire to secure by Letters Patent, is—

The improvement of driving the rough roller A of the herein-specified take-up mechanism of a rotary knitting-machine by means of the friction apparatus herein set forth, or their mechanical equivalents, substantially in the manner and for the purposes herein described, instead of giving a positive rotary motion to this roller, as heretofore, so that this draft roller, with its incumbent take-up roller B, by the combination of a friction driver, without any additional mechanism or any readjustment, continually gives the same tension to the web in knitting, however much the yarn varies in size, or whether much or little yarn is fed to the needles, or whatever quantity of web is on the take-up roller.

CLARK TOMPKINS.

In presence of—
A. C. VAIL,
R. M. TOWNSEND.